Figure 1:
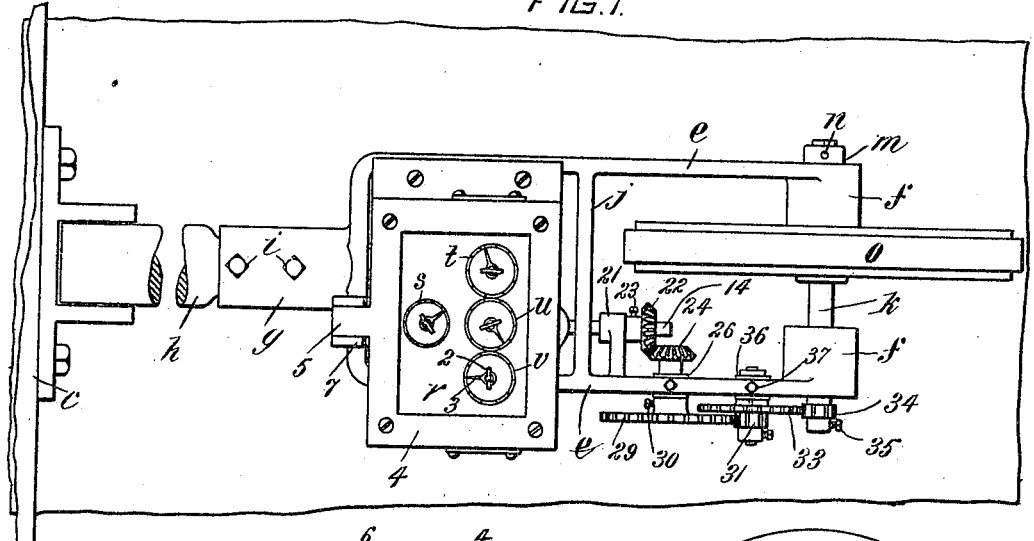

No. 837,034.  
PATENTED NOV. 27, 1906.  
J. H. BURLAND.  
MEASURING AND REGISTERING DEVICE.  
APPLICATION FILED JUNE 1, 1905.

2 SHEETS—SHEET 1.

No. 837,034. PATENTED NOV. 27, 1906.
J. H. BURLAND.
MEASURING AND REGISTERING DEVICE.
APPLICATION FILED JUNE 1, 1905.
2 SHEETS—SHEET 2.
FIG. 3.
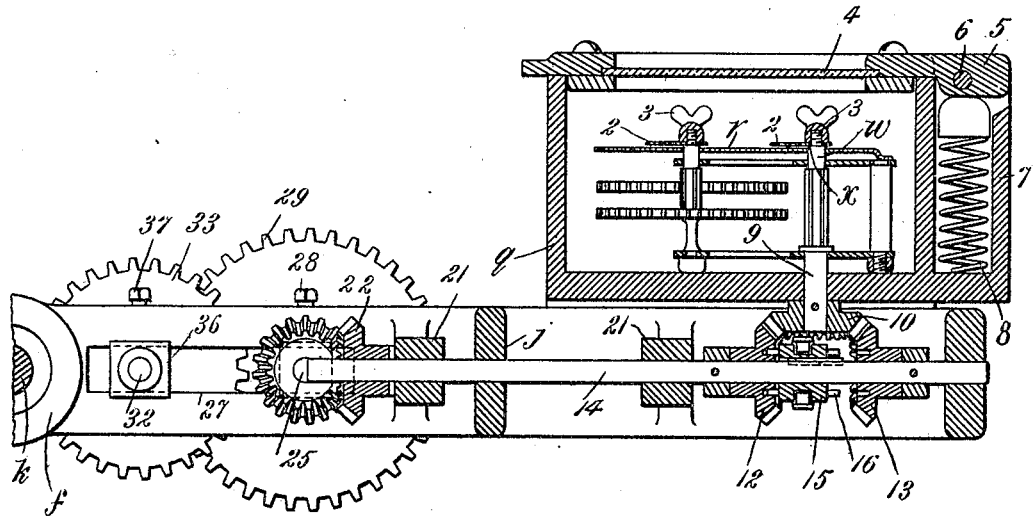
FIG. 5.
FIG. 4.
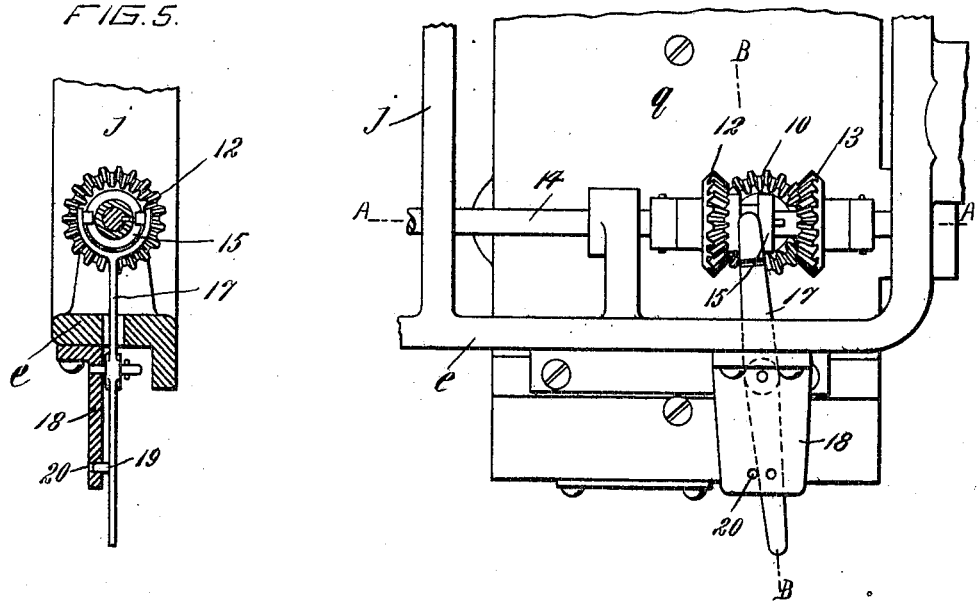
Witnesses
Jeffrey H. Burland
Inventor
By Attorney

UNITED STATES PATENT OFFICE.

JEFFREY HALE BURLAND, OF MONTREAL, QUEBEC, CANADA.

MEASURING AND REGISTERING DEVICE.

No. 837,034.

Specification of Letters Patent.

Patented Nov. 27, 1906.

Application filed June 1, 1905. Serial No. 263,263.

*To all whom it may concern:*

Be it known that I, JEFFREY HALE BURLAND, of the city of Montreal, Province of Quebec, Canada, have invented certain new and useful Improvements in Measuring and Registering Devices; and I do hereby declare that the following is a full, clear, and exact description of the same.

My invention relates particularly to measuring devices adapted to be attached to machines through which materials run in the web; and it has for its object to provide a device capable of measuring in variable units the length of the run through the machine.

The invention may be said, briefly, to consist of the combination with a part of a machine over which a web of paper or other like material travels, of a carrying member rigidly mounted upon the machine and rotatably supporting a shaft upon which is detachably rigidly mounted a roller adapted to rest upon and be rotated by the traveling web, a series of counting-dials with indicating-hands mounted upon the carrying member, and a preferably variable operative connection between the shaft and the indicating-hands of the counting-dials, while clutch mechanism enables the roller to be driven in one direction or the other.

For full comprehension, however, of my invention reference must be had to the accompanying drawings, forming a part of this specification, in which similar reference characters indicate the same parts, and wherein—

Figure 2:
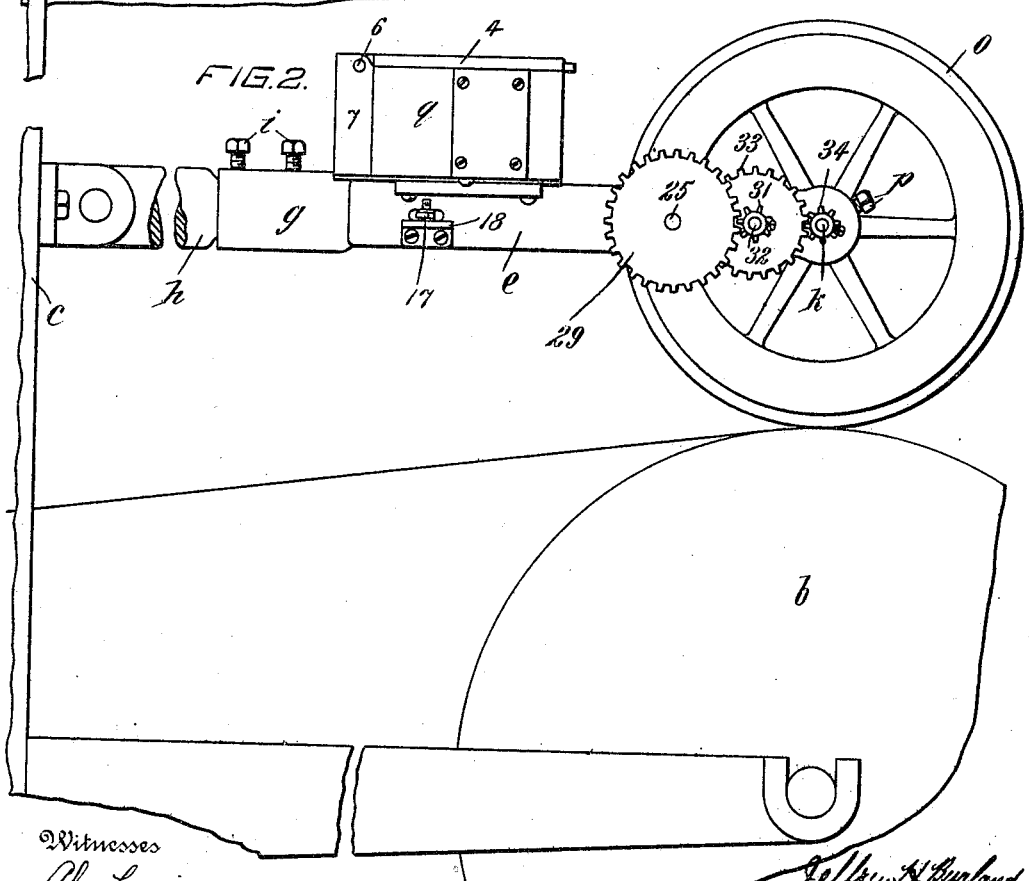

Figure 1 is a plan view of a portion of a machine with my improved measuring device attached thereto, and Fig. 2 is a side elevation thereof. Fig. 3 is an enlarged sectional view taken on line A A, Fig. 4. Fig. 4 is a plan view of a portion of the under side of the device; and Fig. 5 is a sectional view taken on line B B, Fig. 4, the dial-box being removed.

The roll of paper $b$ and part $c$ of the machine in connection with which my invention is illustrated may be those parts of any of the well-known machines utilized either in the manufacture of paper or other material in the web or of articles from paper or like.

The carrying member of my improved measuring and registering device preferably consists of a frame comprising a pair of longitudinal bars $e\ e$, having at one end sleeve-bearings $f\ f$, projecting toward one another and their opposite ends terminating in a socket $g$, adapted to be fitted upon a hinged rod $h$, to which it is rigidly secured by set-screws $i$, while a stay-bar $j$ extends transversely between the longitudinal side bars about midway of their length. A shaft $k$ is rotatably mounted in the sleeve-bearings $f$, and it is retained against axial displacement in one direction by a collar $m$, held in place upon one end thereof by a cotter-pin $n$.

The roller I prefer to use consists of a rubber-tired wheel $o$, secured rigidly upon the shaft $k$, (by a set-screw $p$,) and it also serves to prevent axial displacement of the shaft $k$ in the opposite direction to that prevented by the collar $m$.

A preferably rectangular dial-box $q$ is mounted upon the carrier-frame, and it contains the usual train of gears (not shown) for operating the indicating-hands of recording-dials. A dial-plate $r$, within the box, extends over the train of gears and has a series of four dials $s$, $t$, $u$, and $v$, respectively, marked thereon, while the arbors $w$, which project through the centers thereof, have their ends diminished to form shoulders $x$ and screw-threaded. Indicating-hands 2 are set rotatably upon the diminished ends of the arbors, and they are retained rigidly in any desired angular positions by butterfly-nuts 3, which are screwed upon the ends of the arbors and jam such hands against the shoulders, the object being to enable the hands to be all set to zero each time a new web is to be measured, which is done by unscrewing the butterfly-nuts, moving the hands, and tightening the nuts again. These dials are protected by a glazed cover 4, having an arm 5 at one side hinged a short distance from its end, as at 6, to a hollow extension 7 upon the side of the box, and such cover is held yieldingly closed by a spring 8 within the extension 7 and upon which the end of the arm 5 bears.

The driving-arbor 9 of the train projects through the bottom of the box $q$ and has a bevel-gear 10 mounted rigidly upon its lower end and intermeshing with a pair of bevel-gears 12 and 13, mounted loosely upon a shaft 14, while a clutch-block 15, keyed to this shaft between the gears 12 and 13 and free to be adjusted along the same while rotatable therewith, has pins 16 upon its opposite ends to engage either of the said pair of gears, such block being shifted from one of the gears to the other or to a position therebetween by a lever 17, fulcrumed to a bracket 18 upon the side of the carrier-frame. This lever is set with the block in engagement with either of the gears by a pin 19 thereon engaging in either of a pair of holes 20 in the bracket.

The variable means for operatively connecting the roller to the dials consists of the shaft 14, which is mounted rotatably in bearings 21 upon the carrier-frame, and has a bevel-gear 22 mounted thereon and preferably adjustable along the same, such gear being secured in any position to which it may be adjusted by a set-screw 23. The gear last mentioned intermeshes with a bevel-gear 24, mounted rigidly upon one end of a shaft 25, mounted rotatably in a bearing-box 26 adjustable along a slot 27 in one of the side bars of the carrier-frame and set in place by a set-screw 28. A pinion 29 is mounted upon the opposite end of the shaft 25 and secured thereon by a set-screw 30, and it intermeshes with a pinion 31, secured by a set-screw upon a shaft 32, upon which is also mounted a pinion 33, connected thereto by a feather to enable it to be removed with the pinion 31. The pinion 33 intermeshes with a pinion 34, mounted upon the shaft $k$ and secured thereto by a set-screw 35. The shaft 32 is mounted in a bearing-box 36, adjustably secured in the slot 27 by a set-screw 37. By this arrangement of pinions, gears, and adjustable bearings the rate of speed of rotation of the driving-arbor of the dial-train of gears relatively to the shaft $k$, and consequently the roller, can be increased or diminished to suit varying requirements. For instance, under different conditions it is preferable to have the unit of the dials represent one or more rotations of the roller, which is useful when the length of the unit is too great to enable a roller of equal circumferential length to be conveniently used, pieces of paper are being cut which are greater in length than the circumferential length of the roller.

When operating, the paper running through the machine causes the measuring roller or wheel $o$ to rotate, and the rotary movement thereof is transmitted through the pinions 34, 33, 31, and 29 and gears 24 22, either 12 or 13 and 10 and the shafts upon which the gears are mounted to the arbor 9, and thence through the train of gears in the dial-box and the arbors $w$ to the indicating-hands 2.

In order to enable the number of times a roller is to rotate for each registered unit to be changed, one or more of the pinions are removed and one or more others of different size are substituted therefor, and the bearing-boxes and the bevel-gear 22 are adjusted accordingly, while a wheel $o$ is used of a circumferential length according to requirements, unless the new length is a multiple of that of the unit last utilized, in which case the variable gear is changed to cause the indicating-hands to register a unit upon each, say, third revolution of the wheel, or whatever proportion of the length of the unit the circumferential length of the wheel may be.

What I claim is as follows:

1. In a machine through which a web passes the combination with a stationary part, of an open frame secured upon the stationary part and having a shaft mounted rotatably therein, a wheel mounted rigidly upon the shaft and bearing upon and rotated by the web, a box containing a registering device, mounted upon the frame, a train of gears operatively connected to the shaft, and an operative connection between the train of gears and the registering device.

2. In a machine through which a web passes the combination with a stationary part, of an oblong open frame secured upon the stationary part and having a shaft mounted rotatably longitudinally therein, a wheel mounted rigidly upon the shaft and bearing upon and rotated by the web, a box containing a registering device, mounted upon the frame, a train of gears operatively connected to the shaft, and an operative connection between the train of gears and the registering device.

3. In a machine through which a web passes the combination with a stationary part, of an oblong open frame secured upon the stationary part and having a shaft mounted rotatably longitudinally therein, a wheel mounted rigidly upon the shaft and bearing upon and rotated by the web, a box containing a registering device, mounted upon the frame, a variable train of gears operatively connected to the shaft, and a reversible operative connection between the train of gears and the registering device.

4. In a machine through which a web passes the combination with a stationary part, of, and an oblong open carrying-frame secured upon the machine, a shaft mounted rotatably in the carrying-frame longitudinally thereof, a wheel mounted rigidly upon the shaft and bearing upon and rotated by the web, a box containing a registering device mounted upon the frame, the said registering device comprising a series of coacting dials, arbors centrally of such dials and having their ends diminished and screw-threaded, indicating-hands mounted loosely upon the diminished ends of the arbors, a train of gears operatively connecting the shaft to the registering device, and a series of thumb-nuts retaining the said indicating-hands against displacement in different angular positions upon the arbors and affording means by which the hands may be returned to zero.

5. In a machine through which a web passes and having a hinged rod a carrying-frame presenting side pieces one of which is slotted longitudinally of the frame, such frame terminating at one end in a socket adapted to fit upon the hinged rod, means retaining such frame against displacement, a pair of bearing-boxes adjustably mounted in the slotted side piece, a pair of transverse stub-shafts mounted rotatably in the bearing-boxes, a train of intermeshing pinions detachably mounted upon the corresponding ends of the three transverse shafts, a registering device mounted upon the frame, a shaft rotatably mounted in the frame longitudinally thereof and extending from the registering device to within close adjacency to one of the stub-shafts, a pair of bevel-gears one mounted upon the last-mentioned stub-shaft and the other upon the adjacent end of the longitudinal shaft, a pair of bevel-gears mounted loosely upon the last-mentioned shaft and facing one another and having clutch-faces formed on their adjacent sides, a clutch-block keyed to the shaft between the clutch-faces and movable into engagement with either, an arbor leading from the registering device, and a bevel-gear rigidly upon such arbor and intermeshing with the last-mentioned bevel-gears.

6. In a machine through which a web passes, the combination with a stationary part of the machine, of a carrying-frame, means hinging such frame to the stationary part, a train of gears carried by the said frame, a registering device mounted upon the frame, a shaft rotatably mounted in the frame longitudinally thereof and operatively connected to the registering device and extending to within close adjacency to the train of gears, a gear upon the said shaft and intermeshing with the train of gears, a transverse shaft mounted rotatably in the frame, a wheel secured rigidly upon the last-mentioned shaft, and a gear mounted upon the said last-mentioned shaft and intermeshing with the train of gears.

In testimony whereof I have signed my name to this specification in the presence of two subscribing witnesses.

JEFFREY HALE BURLAND.

Witnesses:
WILLIAM P. McFEAT,
FRED. J. SEARS.